United States Patent
Nishijima et al.

[11] Patent Number: 5,904,366
[45] Date of Patent: May 18, 1999

[54] AIR BAG APPARATUS

[75] Inventors: Kazuyoshi Nishijima; Kazuhiro Kaneko; Michitaka Suzuki; Toshiyuki Sugiyama, all of Fuji, Japan

[73] Assignee: Nihon Plast Co., Ltd., Shizuoka-ken, Japan

[21] Appl. No.: 09/035,257

[22] Filed: Mar. 5, 1998

[30] Foreign Application Priority Data

Mar. 11, 1997 [JP] Japan .................................. 9-055990

[51] Int. Cl.⁶ .............................................. B60R 21/16
[52] U.S. Cl. ........................................ 280/728.2; 280/731
[58] Field of Search ........................ 280/728.2, 728.3, 280/731

[56] References Cited

U.S. PATENT DOCUMENTS

| | | | |
|---|---|---|---|
| 4,934,735 | 6/1990 | Embach | 280/731 |
| 5,419,585 | 5/1995 | Breed et al. | 280/731 |
| 5,692,770 | 12/1997 | Scharboneau et al. | 280/728.2 |
| 5,704,635 | 1/1998 | Tajiri et al. | 280/728.2 |
| 5,765,860 | 6/1998 | Osborn et al. | 280/728.2 |

Primary Examiner—Lanna Mai
Assistant Examiner—Faye M. Fleming
Attorney, Agent, or Firm—Jones & Askew

[57] ABSTRACT

A folded air bag is covered with a synthetic resin cover body. A switch apparatus having a membrane switch and a back plate is disposed between the cover body and the air bag. The membrane switch is adhered to the back plate at a point in a central portion. An extension portion of the back plate is mounted to the base plate, thereby deploying outward independently from the cover at a time of expansion and deployment of the air bag.

14 Claims, 10 Drawing Sheets

AIR BAG APPARATUS

BACKGROUND OF THE INVENTION

1. Field of the Invention

The present invention relates to an air bag apparatus including a switch.

2. Description of the Related Art

Conventionally, in order to protect the driver for an automotive vehicle from an impact due to a collision and the like, an air bag apparatus disposed in a boss portion (a center pad portion) of a steering wheel has been known. The air bag apparatus is provided with an inflator for generating a gas, a bag-like air bag housed in a folded manner, a module cover (a center pad) for covering the air bag, and a base plate to which the inflator, the air bag and the cover body and the like are mounted. Then, the air bag apparatus is structured such as when a gas is released from the inflator, the cover breaks along a predetermined tear line (a breaking line) from the pressure due to the expansion of the air bag so as to open like a door, projecting the air bag from the cover to expand and deploy on the side of the occupant, at a time of detecting a collision of the vehicle.

Further, a switch for operating a horn and the like has been conventionally assembled in the pad body arranged in the boss portion, and combined with the air bag apparatus in the vehicle, and operability can be improved by assembling the switch in the cover body of the air bag apparatus positioned in the boss portion.

Furthermore, since a door piece portion from which the air bag expands and projects from the cover, a switch mechanism capable of turning between an ON and OFF state with a suitable operational feeling without affecting the formation and a opening of the door piece portion, that is, a smooth deployment is desired.

In this view, for example, an air bag apparatus described in Japanese Patent Application Laid-Open No. 7-40838 has been known. In this structure, a membrane-like switch (a membrane switch) is mounted inside under the surface of the cover, the back surface of the membrane switch is covered by a rigid panel (a back panel), and a peripheral edge portion of the rigid panel is fixed to the cover body. Then, it is structured such that when the cover body is pressed, the membrane switch is pressed through the cover body, thereby closing a circuit.

However, in the structure described in Japanese Patent Application Laid-Open No. 7-40838, the switch and the rigid panel are mounted to the cover body which is torn at a time when the air bag expands so as to deploy, thereby forming three layers, and the rigid panel is mounted only to the cover body at a plurality of fastening points. Accordingly, it is necessary to mount the switch and the rigid panel to the cover body firmly and reliably, while also it being necessary that the three layers smoothly and rapidly deploy outward at a time when the cover body tears, this causes a problem increasing manufacturing cost due to complication of structure, an enlargement of a size, an increase in assembly time, and a difficulty of design. Further, there is a problem in that it becomes difficult to make whole of the air bag apparatus compact in order to retain the flexibility of the door piece portion of the cover and the space occupied by the switch is increased.

SUMMARY OF THE INVENTION

The present invention has been achieved with such points in mind.

It therefore is an object of the present invention to provide an air bag apparatus in which an air bag can be smoothly deployed with a simple structure while also having a good and an operational feeling of the switch.

To achieve the object, according to a first aspect of the present invention, there is provided an air bag apparatus comprising: an air bag expanding and deploying by a gas generation; a cover body having a deformable and tearable cover portion for covering the air bag; and a switch apparatus disposed between the air bag and the cover portion, wherein the switch comprises: a contact point body largely formed in a plate shape; a support body having a support portion for supporting a side of the contact point body close to the air bag and a deformable extending portion extended from the support portion; and an adhering member for adhering the contact point body to the support body at a point.

In the air bag apparatus in accordance with the first aspect of the present invention, when the cover portion of the cover body is pressed, the contact point body of the switch apparatus is pressed through the cover portion, so that the switch is closed in a state that at least a part of the contact point body is deformed. Then, since the contact point body is supported by the support portion of the support body at the side close to the air bag, operational feeling is improved. Further, when the gas flows into the air bag, the cover portion tears at a predetermined position due to cover expansion and occurs deployment of the air bag by means of a breakage or the like, so as to form the projecting port for the air bag. Accordingly, the air bag can be projected from the cover body, and then expanded and developed. At this time, the support body is structured such that the support portion mounting the contact point body opens underward independently from the cover portion to another portion other than the cover portion, thereby not affecting the smooth deployment of the cover portion, allowing the cover portion to be torn. Further, the contact point body is mounted to the support portion, however, since the contact point body is adhered at a point, the contact point body does not affect a smooth deployment of the support portion. Still further, since the contact point body is adhered to the support body at a point, the structure and manufacturing process are made simple, so that the manufacturing cost can be reduced.

Furthermore, to achieve the object, according to a second aspect of the present invention, there is provided an air bag apparatus comprising: an air bag expanding and inflating by a gas generation; a cover having a deformable and tearable cover portion for covering the air bag; and a switch apparatus disposed between the air bag and the cover portion, wherein the switch comprises: a contact point body largely formed in a plate shape; a support body having a support portion for supporting a side of the contact point body close to the air bag and a deformable extending portion extended from the support portion; and an adhering member for adhering the contact point body to the support body at a substantially central portion of the contact point body.

In accordance with the second aspect, when the cover portion of the cover body is pressed, the contact point body of the switch apparatus is pressed through the cover portion, so that the switch is closed in a state that at least a part of the contact point body is deformed. Then, since the contact point body is supported by the support portion of the support body at the side close to the air bag, an operational feeling is improved. Further, when the gas flows into the air bag, the cover portion tears at a predetermined position due to expansion and deployment of the air bag by means of breakage or the like, so as to form the projecting port for the air bag. Accordingly, the air bag can be projected from the cover body, and then expanded and fully deployed. At this time, the support body is structured such that the support portion mounting the contact point body opens outward independently from the cover portion by fixing the extending portion to another portion other than the cover portion, thereby not affecting the smooth deployment of the cover portion, so that the cover portion can be smoothly torn.

Further, the contact point body is mounted to the support portion, however, since the contact point body is adhered to the support body at the substantially central portion, the contact point body does not affect the smooth deployment of the support portion. Further, since the contact point body is adhered to the support body largely central portion, the structure and manufacturing process can be made simple, in turn reducing manufacturing cost.

In accordance with a third aspect, as it depends from the first or the second aspect, the adhering member is integrally formed in either or both of the contact point body and the support body.

Accordingly, in this construction, the structure can be simplified and the manufacturing cost can be reduced.

In accordance with a fourth aspect, as it depends from the first, the second or the third aspect, the adhering member is provided with a locking portion disposed in the support body; and a lock receiving portion locked by an insertion of the locking portion is provided in the contact point body.

Accordingly, in this construction, the contact point body can be easily mounted to the support body by inserting the locking portion disposed in the support body into the lock receiving portion disposed in the contact point body and locking therebetween, so that the manufacturing process can be made simple and the manufacturing cost reduced.

In accordance with a fifth aspect, as it depends from the fourth aspect, the locking portion is provided with a shaft portion and a locking piece portion projecting from the shaft portion; and the lock receiving portion is provided with a shaft receiving hole portion into which the shaft portion is rotatably inserted, an insertion hole portion continuously disposed in the shaft receiving hole portion and to which the locking piece portion can be inserted, and with a locking surface portion supporting the locking piece portion.

Accordingly, in this construction, as well as the contact point body and the support body are relatively positioned with each other so as to insert the shaft portion to the shaft receiving hole portion, the locking piece portion is inserted into the inserting hole portion, and the contact point body and the support body are relatively rotated at a predetermined angle around the shaft portion, whereby the locking piece portion can be locked with the locking surface portion and the contact point body can be easily mounted to the support body.

In accordance with a sixth aspect, as it depends from the fourth aspect, the locking portion is provided with a locking piece portion projecting to a direction largely along the deploying direction of the switch body.

Accordingly, in this construction, the lock receiving portion can be securely held by the locking piece portion even at a time of deployment.

In accordance with a seventh aspect, as it depends from the fourth aspect, the locking portion is provided with a locking piece portion projecting to a direction crossing to the deploying direction of the switch body.

Accordingly, in this construction, the influence which the locking piece portion has on the support body at a time of deployment can be reduced and deployment can be smoothly performed.

In accordance with an eighth aspect, as it depends from one aspect among the first aspect to the seventh aspect, the switch apparatus is provided with an elastically deformable cushion member.

Accordingly, in this construction, the operational feeling can be easily improved.

BRIEF DESCRIPTION OF THE ACCOMPANYING DRAWINGS

The above and further objects and novel features of the present invention will appear more fully from the following detailed description when the same is read in conjunction with the accompanying drawings, in which:

FIGS. 8A to 8H are schematic views of an assembling process which show the other embodiment in accordance with the present invention, in which

DETAILED DESCRIPTION OF THE PREFERRED EMBODIMENTS

There will be detailed below the preferred embodiments of the present invention with reference to the accompanying drawings. Like members are designated by like reference characters.

Figure 2:
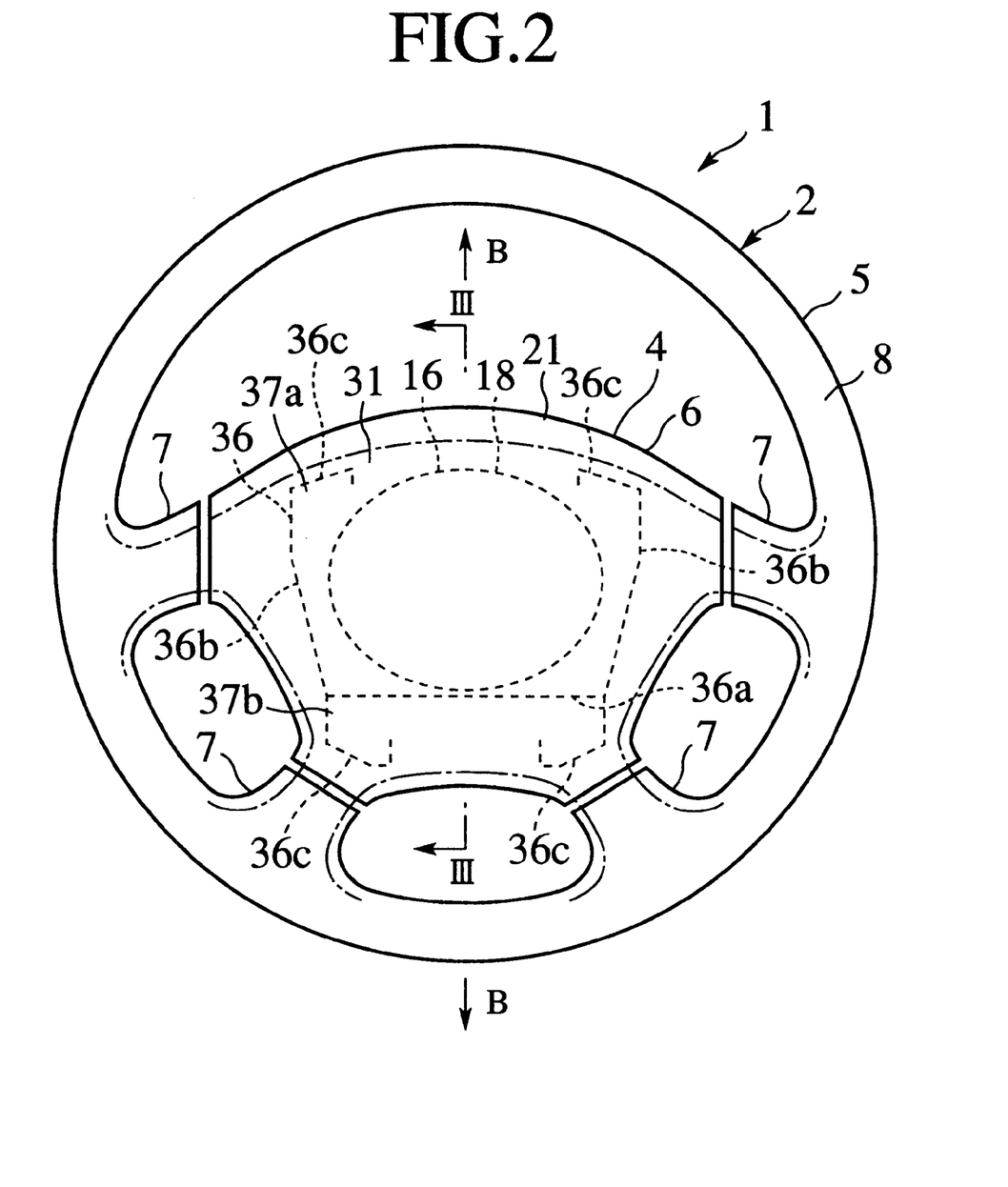
FIG. 2 is a plan view which shows a steering wheel attaching the air bag apparatus therewith.

In FIG. 2, reference numeral 1 denotes a steering wheel for an automotive vehicle, and the steering wheel 1 is constituted by a steering wheel body 2, an air bag apparatus (an air bag module) 4 attached to the steering wheel body 2 in a side close to an occupant, and the like. In this case, the steering wheel 1 is structured such as to be mounted to a steering shaft normally provided in an inclined state, however, in the following description, it is considered that a side close to an occupant corresponding to a front side of the air bag apparatus 4 is an upper side, and a side close to a vehicle body corresponding to a bottom side of the air bag apparatus 4 is a lower side.

Then, the steering wheel body 2 is constituted by an annular rim portion 5, a boss portion 6 positioned inside the rim portion 5, and four spoke portions 7 connecting the rim portion 5 and the boss portion 6. Further, a boss fitted to a steering shaft (not shown) is provided in a lower portion corresponding to the vehicle side of the boss portion 6, and a boss plate is integrally mounted to the boss by welding or the like. Then, a core metal of the spoke portion 7 is connected to the boss plate, and a core metal of the rim portion 5 is connected to the core metal of the spoke portion 7. Further, a skin portion 8 made of a soft foamed polyurethane resin or the like is formed in an outer peripheral portion of the core of the rim portion 5 and an outer peripheral portion of a portion close to the rim portion 5 in the core metal of the spoke portion 7.

Figure 1:
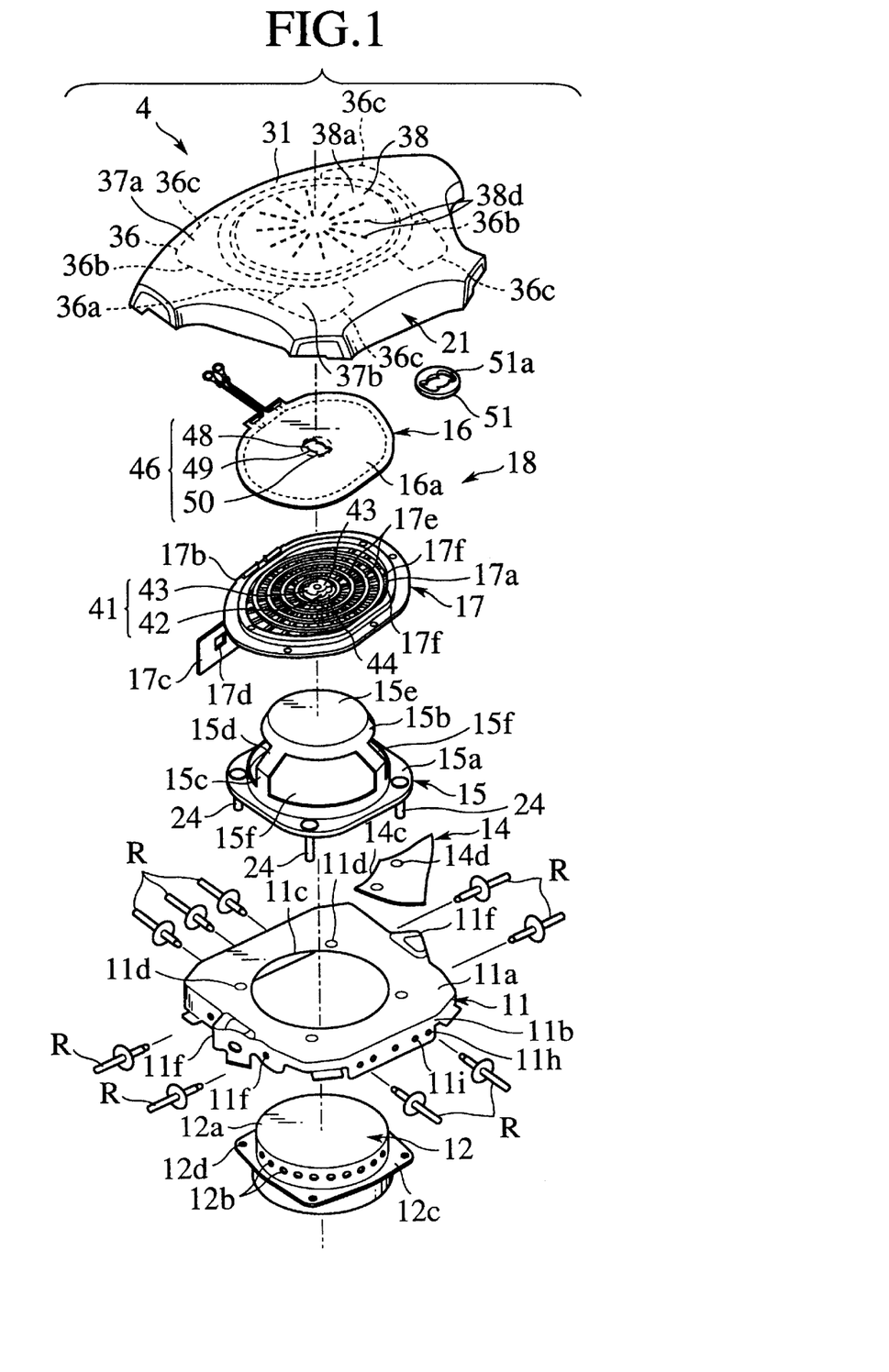
FIG. 1 is an exploded perspective view which shows an embodiment of an air bag apparatus in accordance with the present invention.
Figure 3:
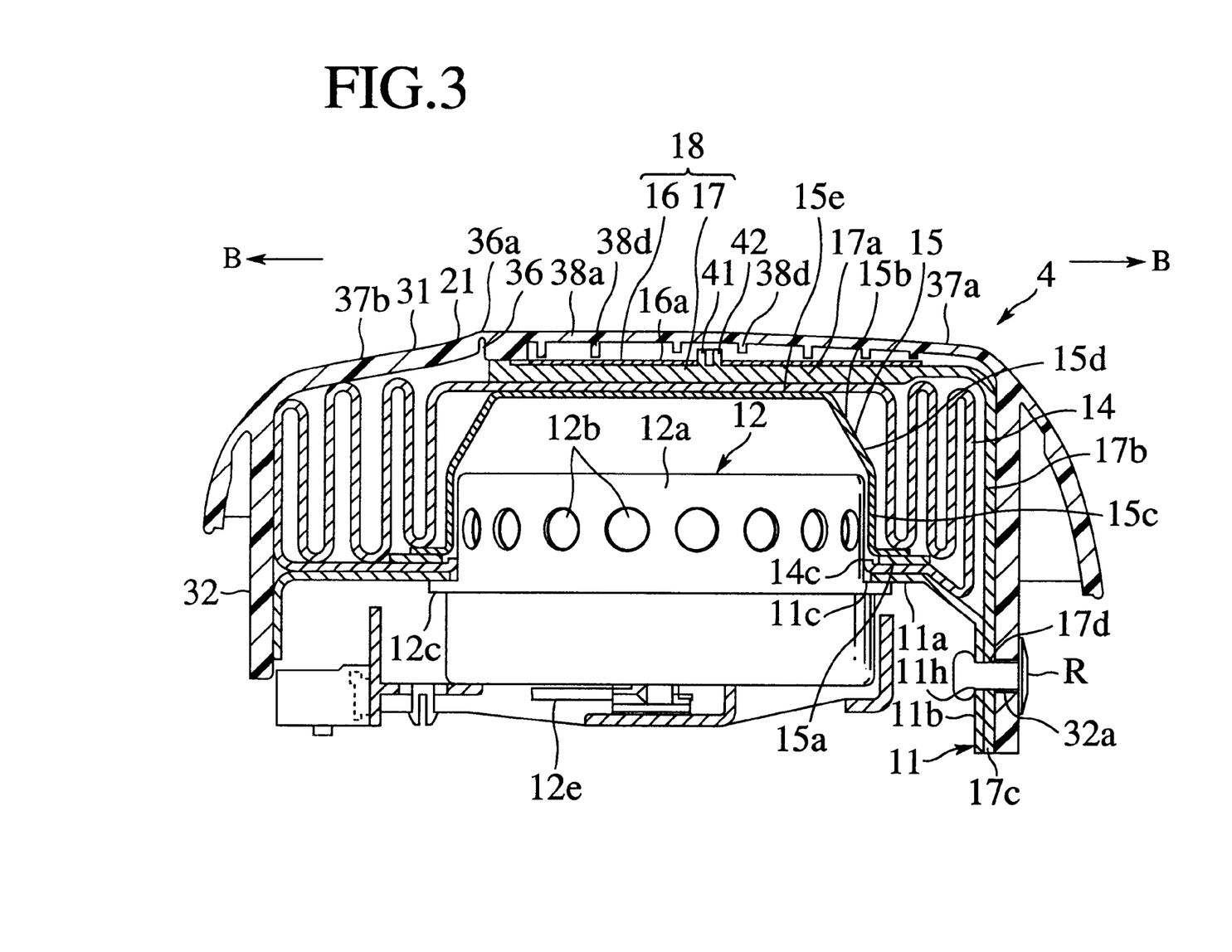
FIG. 3 is a cross sectional view along a line III—III in FIG. 2 which shows the air bag apparatus.

Further, the air bag apparatus 4 is attached to an upper side of the boss portion 6, and as shown in FIGS. 1 to 3, it is structured such that an inflator 12 and an air bag 14 are mounted to a base plate 11 corresponding to a mounting member, and a switch apparatus 18 having a retainer 15, a membrane switch 16 corresponding to a contact point body and a back plate 17 corresponding to a supporting body, and a cover body 21 are mounted to the base plate 11.

Then, the base plate 11 is formed by bending a steel plate so that an upper plate portion formed largely in a flat rectangular shape and a peripheral wall portion 11b going downward from a peripheral edge portion of the upper plate portion 11a and formed largely in a rectangular cylindrical shape. Further, in the upper plate portion 11a, an inflator mounting hole 11c formed in a circular hole shape is formed in a center portion, and a plurality of bolt through holes 11d are formed in a peripheral position of the inflator mounting hole 11c. Still further, a pair of bracket mounting portions 11f disposed in both sides are formed in the peripheral wall portion 11b, a nut is integrally mounted inside the bracket mounting portion 11f, and a plurality of rivet through holes 11h are pierced in the peripheral wall portion 11b at a predetermined interval. Furthermore, a locking hole 11i is formed in the front and the rear peripheral wall portions 11b in such a manner as to be positioned between the rivet through holes 11h. Then, the base plate 11 is structured such as to be fixed to a pair of the both sides brackets disposed in a boss plate of the steering wheel body 2 by a bolt which is engaged with the nut of the bracket mounting portion 11f.

Further, the inflator 12 is provided with an inflator body 12a formed largely in a cylindrical shape, and a gas injection port 12b for directing a gas is radially formed in an upper side portion of the inflator body 12a at predetermined intervals. Then, a mounting flange portion 12c extending toward an outer peripheral side is projected from the inflator body 12a, and a plurality of bolt through holes 12d are formed in the flange portion 12c. Further, a starting portion (an ignition device or a squib) connected to a lead wire 12e introduced from a lower side of the inflator body 12a is provided within the inflator body 12a, and is filled with pellets in such a manner as to surround the periphery of the ignition portion, so that a reaction of the drug pellets are ignited by sending electric pulse to the ignition portion, thereby generating a large amount of inert gas, for example, a nitrogen gas in instantaneously and diffusing from the gas injection port 12b.

Furthermore, the air bag 14 is formed in a bag shape by overlapping two circular woven fabric cloths or the like having the same outer shape and sewing the periphery thereof. Further, an opening portion 14c formed in a circular hole shape and to which an upper half portion of the inflator 12 is inserted is provided in the center portion of the lower surface in the air bag 14, a plurality of bolt through holes 14d are formed in such a manner as to be positioned in the periphery of the opening portion 14c, and one or more venting holes (not shown) is formed at a position apart from the opening portion 14c. Further, an annular reinforcing fabric is overlapped near the opening portion 14c and the deaerating port, respectively, and integrally sewn, thereby securing a reinforcement.

Further, an annular base portion 15a and a cup portion 15b extending upward from an edge portion of an inner periphery of the base portion 15a and corresponding to an expansion member are formed in an integral manner or a separate manner in the retainer 15. Then, in the base portion 15a, an outer shape in a plane is formed in a rectangular shape having round corners, an inner side is opened in a circular shape, a plurality of through holes (not shown) are formed in a flat portion of the base portion 15a at equal intervals, and a mounting bolt 24 is inserted into each of the through holes from the upper side, thereby being integrally adhered by a spot welding or the like. Further, it is structured such that a nut (not shown) is meshed with each of the mounting bolts 24. On the contrary, a cylinder portion 15c extending upward from the base portion 15a, a frusto-conical portion 15d extending toward an upper side of the cylinder portion 15c and reducing a diamter toward an upward direction, a top plate portion 15e closing a top surface of the frusto-conical portion 15d are formed in the cup portion 15b. Then, as well as an upper half portion of the inflator body 12a in the inflator 12 is housed within the cylinder portion 15c of the cup portion 15b, a plurality of gas insertion ports 15f are formed from the cylinder portion 15c to the frusto-conical portion 15d.

Then, the cover body 21 is integrally formed by an injection molding with using a synthetic resin such as a soft thermoplastic elastomer, and has a cover portion 31 for covering the boss portion of the steering wheel body 2 and a part of the spoke portion 7, and a mounting piece portion 32 projecting downward from a back surface of the cover portion 31 and formed substantially in a rectangular cylinder shape.

Then, a surface (a top surface) of the cover portion 31 of the cover body 21 is continuously modelled to harmonize with the skin portion 8 covering four spoke portions 7 and is structured by combining the curved surfaces being curved in a longitudinal direction and a lateral direction, thereby being harmonized with an instrument panel and the like. Further, a back surface (a lower surface) of the cover portion 31 of the cover body 21 is positioned inside the mounting piece portion 32, and is formed substantially in a H shape in a recessed manner, so that a tear line 36 corresponding to a breaking portion (a breakage inducing portion) which is weaker than the other portion of the cover portion 31 is formed. Accordingly, the tear line 36 is provided with a horizontally crossing portion 36a longitudinally crossing the lateral direction and a pair of vertically crossing portion 36b continuously disposed in both end portions of the horizontally crossing portion 36a and extending along the inner side of the mounting piece portion 32, so that a pair of door piece portions 37a and 37b disposed in front of and at the back of the tear line are formed in such a manner that the cover portion 31 is broken and opened along the tear line 36 and is rotated and deployed in the longitudinal direction. In this case, the horizontally crossing portion 36a of the tear line 36 is shifted to the back side against the vehicle (the front side against the occupant) from the center portion of the cover portion 31, and is formed in a linear shape or a curved shape toward the front side. Further, a terminal portion 36c of each of the vertically crossing portion 36b is inverted in such a manner that a front end portion becomes in parallel to the vertically crossing portion 36b, thereby preventing breakage from transmitting to the other portion than the tear line 36 at a time of forming the door piece portions 37a and 37b.

Further, a switch arrangement portion 38 is formed in a back surface side of the front door piece portion 37a, as shown in FIGS. 1 and 3. Then, a thin portion 38a recessed substantially in an oval shape is formed in the switch arrangement portion 38, thereby forming a horn switch operation portion elastically deformable in a vertical direction. Further, a multiplicity of projections 38d are radially projected downward from the thin portion 38a, and an imaginary surface connecting the front end portions of these projections 38d is set to be a cylinder surface or a planner surface as occasion demands.

On the contrary, the mounting piece portion 32 of the cover body 21 is substantially formed as a rectangular cylindrical shape fitted to an outer side of the peripheral wall portion 11b of the base plate 11, a plurality of rivet through holes 32a communicating with the rivet through hole 11h of the peripheral wall portion 11b are formed at a predetermined interval, and a pair of notch portions for the mounting portion are formed in such a manner as to be fitted to the bracket mounting portions 11f disposed in the both sides thereof. Further, a locking projection portion is projected in the front and rear mounting piece portions 32 in such a manner as to be positioned between the rivet through holes 32a.

Further, in the back plate 17, as shown in FIGS. 1 to 4, a switch holding portion 17a corresponding to a support portion formed largely in a flat oval shape and an extending portion 17b extending from the switch holding portion 17a are integrally formed by a synthetic resin such as a polyester elastomer and the like. Then, a locking portion 41 constituting an adhering means is integrally formed in the center portion of the switch holding portion 17a. Then, the locking portion 41 is formed in a T like shape, and a shaft portion 42 upwardly projecting from the center portion of the switch holding portion 17a in such a manner as to form a cylindrical shape and a locking piece portion 43 projecting to a lateral direction along the switch holding portion 17a from the upper end portion of the shaft portion 42 are integrally formed. In this case, a slit 44 is formed in the switch holding portion 17a in such a manner as to be positioned in the lower side of the locking piece portion 43, and is structured such as to be molded by a metal mold having a simple structure attaching and detaching in vertical direction. However, in the case of using a metal mold having a slide mechanism moving to a horizontal direction, the slit is not always necessary. Further, a mounting portion 17c projecting to both sides is formed in the front end portion of the extending portion 17b of the back plate 17, and a mounting hole 17d is formed in the mounting portion 17c at a predetermined interval to the both side direction.

On the contrary, the membrane switch 16 constitutes a horn switch for an automotive vehicle, and is provided with a switch body 16a elastically deformable or having a flexibility and formed in a planner oval plate shape, that is, in a (thin) film shape, in a sheet shape or a surface shape. Then, the switch body 16a is similar to the switch holding portion 17a, is wholly mounted on the switch holding portion 17a, is provided with a sheet made of a polyethylene terephtalate (PET) resin corresponding to a pair of polyester resin film bodies overlapped with each other, and forms a contact point by adhering an electric conductive film such as an annular copper foil on the opposing surfaces of the sheets. Further, a compressibly deformable spacer such as silicone rubber or the like is arranged between the electric conductive films at predetermined intervals in a dot manner by printing or the like, the electric conductive films are detached with each other in a state that no force is applied, and the electric conductive films are brought into contact with each other in a state of pressing the switch body 16a, so that the switch (circuit) is closed. Further, the lead wire 16d is connected to the electric conductive film through the terminal portion 16c one by one, and is connected to a horn circuit in the vehicle body side through the connector 16e disposed in the end portion of the lead wire 16d and further through a cable reel apparatus (not shown).

Further, a lock receiving portion 46 is formed in the center portion of the switch body 16a of the membrane switch 16. Then, an upper surface of the lock receiving portion 46 corresponds to a locking surface portion 48, and a shaft receiving hole portion 49 formed in a circular hole shape and an insertion hole portion 50 continuously disposed in front of and at the back of the shaft receiving hole portion 49 are respectively formed in such a manner as to be similar to the shaft portion 42 of the locking portion 41 and the locking piece portion 43.

Figure 4:
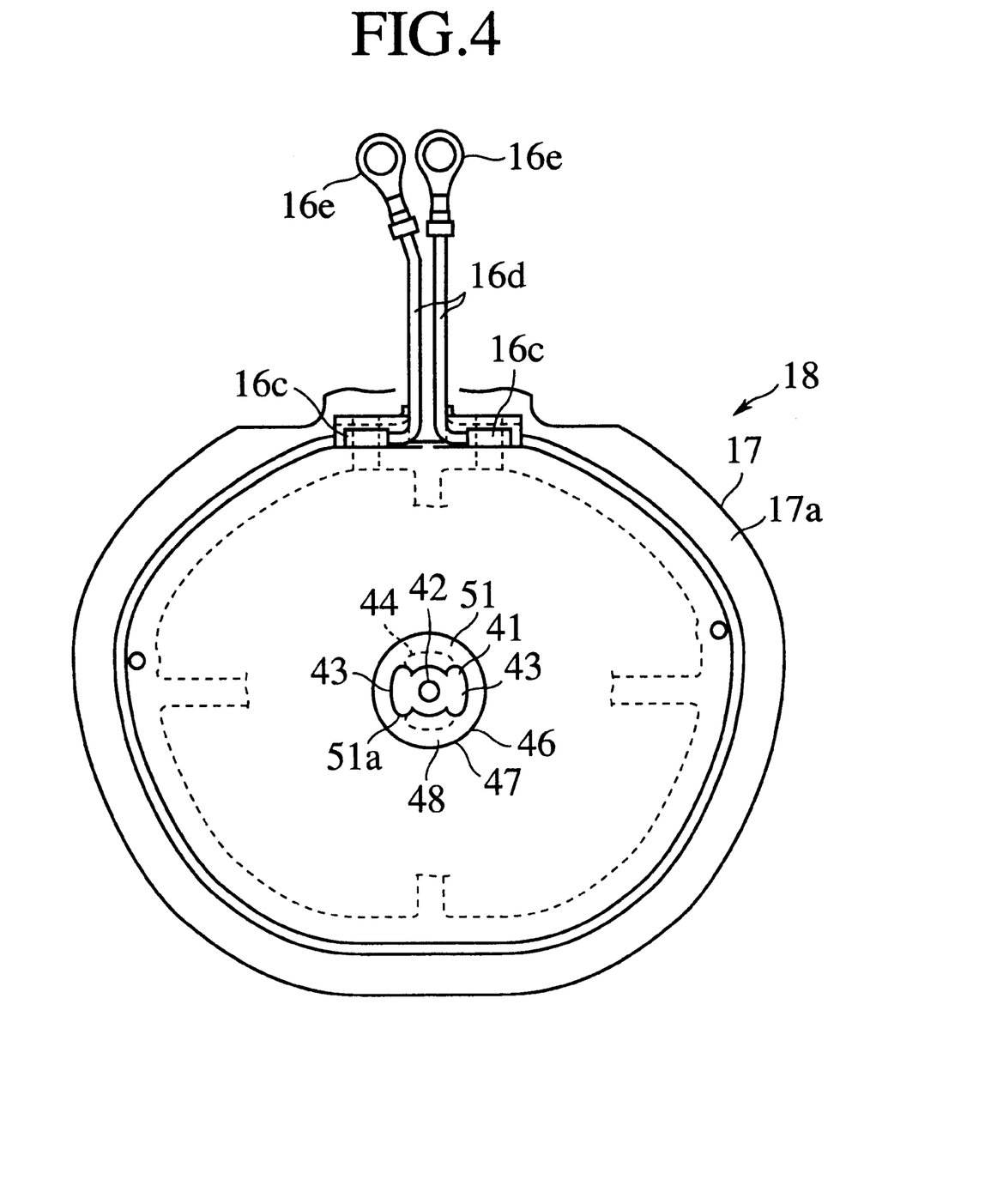
FIG. 4 is a partially plan view of a switch apparatus.

In this case, in accordance with the embodiment, the spacer is formed in a circular arc like shape, and is arranged along a plurality of concentric circles having a center of the shaft receiving hole portion 49. Further, a plurality of concentric ribs 17e and a radial rib 17f formed in a radial shape and connecting between the concentric ribs 17e are integrally formed in the switch holding portion 17a of the back plate 17 substantially around the shaft portion 42 of the locking portion 41, and the concentric rib 17e is disposed at a position where the spacer of the membrane switch 16 is not provided, that is, a position where the electric conductive films are directly opposed to each other. Further, the radial rib 17f is formed in such a manner that a height thereof is smaller than that of the concentric rib 17e.

Next, an assembling process of the air bag apparatus 4 will be described below.

Figure 5:
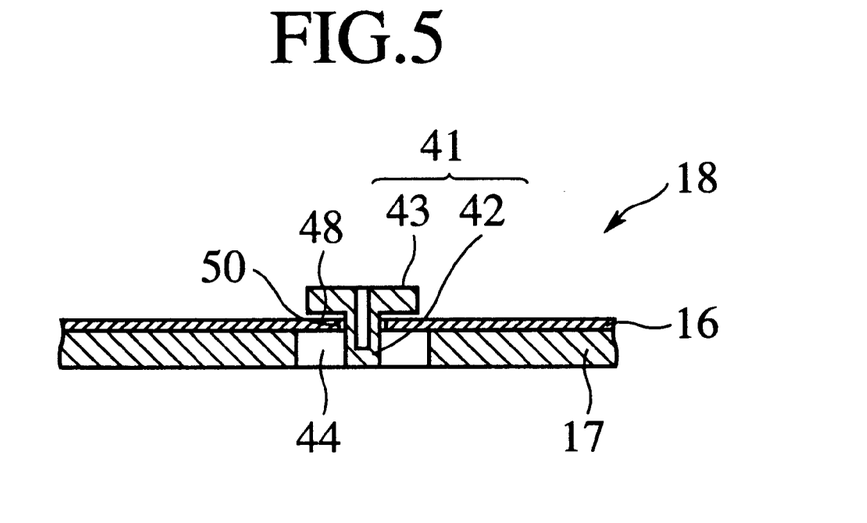
FIG. 5 is a partially cross sectional view of the switch apparatus.

At first, the membrane switch 16 is mounted to the back plate 17, thereby constituting the switch apparatus 18. At this time, the shaft portion 42 and the locking piece portion 43 of the locking portion 41 are aligned to and inserted into the shaft receiving hole portion 49 of the lock receiving portion 46 and the insertion hole portion 50. In this state, the shaft portion 42 is rotatably positioned in the shaft receiving hole portion 49 so as to be held. Next, the locking piece portion 43 is locked on the locking surface portion 48 by rotating the membrane switch 16 at about 90 degrees and directing to a predetermined direction, as shown in FIG. 5, and the membrane switch 16 is adhered to the back plate 17 at a point in the center portion. Further, in accordance with the embodiment, a reinforcing film 51 is used, thereby reinforcing the lock receiving portion 46 and preventing the locking portion 41 from coming out. Accordingly, the reinforcing film 51 is formed in a flat circular shape having an adhering portion in the lower surface, and a long hole 51a having the same shape as that of the shaft receiving hole portion 49 and the insertion hole portion 50 is formed. Then, the insertion hole portion 50 of the lock receiving portion 46 is closed and the locking portion 41 is prevented from coming out by inserting the long hole 51a into the locking portion 41 and adhering on the back plate 17 in a state of inserting the locking portion 41 into the lock receiving portion 46 and rotating to a predetermined position. In this case, the locking portion 41 and the lock receiving portion 46 may be adhered by caulking or the like. Further, without using the reinforcing film 51 or the caulking, since the lead wire 16d is introduced out from the membrane switch 16, the membrane switch 16 is prevented from rotating by fixing the position to the lead wire 16d, that is, the locking portion 41 is prevented from coming out with respect to the lock receiving portion 46.

Further, in order to mount the air bag 14 to the base plate 11, the retainer 15 is inserted into the air bag 14 from the opening portion 14c and the mounting bolt 24 is inserted into each of the bolt through holes 14d of the air bag 14. Then, the opening portion 14c of the air bag 14 and an edge portion of the inner peripheral side of the base portion 15a of the retainer 15 are aligned with each other. Continuously, when the mounting bolt 24 projecting from the air bag 14 is inserted into the bolt through hole 11d of the base plate 11 from the upper side, the inflator mounting hole 11c of the base plate 11 is aligned with the opening portion of the air bag 14. Then, in this state, the air bag 14 is held between the retainer 15 and the base plate 11 and is temporarily fixed.

Continuously, for example, the air bag 14 is folded in such a manner as to be received within the outer peripheral shape of the top plate portion 11a of the base plate 11 by folding the air bag 14 around the outer peripheral portion of the cup portion 15b of the retainer 15 like a petal. At this time, the air bag 14 is structured such that about only a sheet of ground fabric is positioned on the top plate portion 15e of the cup portion 15b, and the other portions are folded on the periphery of the cup portion 15b.

Then, the switch apparatus 18 mounting the membrane switch 16 to the back plate 17 is arranged at a predetermined position inside the cover body 21, and further, the peripheral wall portion 11b of the base plate 11 mounting the folded air bag 14 is fitted inside the mounting piece portion 32 of the cover body 21, so that the air bag 14 is covered by the cover body 21.

Then, the positioning and the temporary fixation is performed by engaging the locking and projecting portion projecting from the mounting piece portion 32 of the cover body 21 with the locking hole 11i of the peripheral wall portion 11b in the base plate 11 through the locking hole 17d of the back plate 17. Then, the mounting piece portion 32 of the cover body 21 is fixed to the base plate 11 by inserting a rivet R into the rivet through hole 32a from the outer portion of the mounting piece portion 32 in the cover body 21 in this state, and passing through the rivet through hole 11h of the peripheral wall portion 11b in the base plate 11 through the center locking hole 17d in the back plate 17 so as to caulk. Further, in this state, the switch body 16a of the membrane switch 16 is positioned between the horn switch operating portion of the cover body 21 and the air bag 14 on the top plate portion 15e of the retainer 15, and the mounting portion 17c of the back plate 17 is held between the peripheral wall portion 11b of the base plate 11 and the mounting wall portion 32 of the cover body 21 so as to be fixed.

Further, as shown in FIG. 3, the air bag apparatus 4 is assembled by inserting the inflator body 12a of the inflator 12 into the opening portion 14c of the air bag 14 from the back surface side of the base plate 11 through the inflator mounting hole 11c so as to be arranged within the cup portion 15b, inserting the mounting bolt 24 projecting to the lower side of the base plate 11 into the bolt through hole 12d of the flange portion 12c, and fastening by the nut 25.

Then, it is structured such that the air bag apparatus 4 is fixed to the steering wheel body 2 by fixing the bracket mounting portion 11f of the base plate 11 to the bracket of the steering wheel body 2 by a bolt, and the membrane switch 16 is connected to the circuit of the horn apparatus disposed in the vehicle body side by connecting the connector 16e of the membrane switch 16 to the cable reel apparatus or the slip ring apparatus through the wire harness.

Then, by pressing (pressurizing) the horn switch operation portion in the cover portion 31 of the cover body 21 by a finger or the like, the horn switch operation portion is downwardly bent and elastically deformed. Then, the projection 38d provided in the back surface of the horn switch operation portion presses the top surface of the membrane switch 16 having a lower surface supported by the back plate 17 so as to deform in such a manner as to compress a size of the thickness, holds between the radial projection 38d of the cover body 21 and the concentric rib 17e of the back plate 17, and the circuit is closed in a state that the opposing electrically conductive films are in contact with each other, so that the horn is operated.

Further, when the automotive vehicle collides, the ignition device of the inflator 12 is driven by a signal from a collision diagnosis unit (not shown) and the filled propellant is reacted, whereby an inert gas such as a nitrogen gas is rapidly released into the air bag 14 through the gas injection port 12b formed in the peripheral surface of the inflator 12 and the gas insertion port 15f formed in the cylindrical portion 15c of the retainer 15, so that the folded air bag 14 is rapidly expanded. Then, the cover portion 31 of the cover body 21 is torn open largely along the tear line 36 in a H like shape due to the expansion pressure of the air bag 14, so that a pair is formed by the front and rear door piece portions 37a and 37b. Further, the door piece portions 37a and 37b are rotated longitudinally (in a direction of an arrow B), and the back plate 17 mounting the membrane switch 16 is forward rotated, so that the projecting port of the air bag 14 is formed. Then, the air bag 14 is projected from the projecting port so as to expand and deploy to the front side of the occupant, thereby reducing the impact due to the collision.

Still further, in accordance with the embodiment, by pressing the horn switch operation portion in the cover portion 31 of the cover body 21, the membrane switch 16 is pressed through the cover portion 31 and at least a part of the switch body 16a are deformed in a compressing manner, so that the circuit is closed in a state that the opposing electric conductive films are in contact with each other and the horn can be operated.

Furthermore, since the switch apparatus 18 is supported by mounting the extending portion 17b extended from the switch holding portion 17a of the back plate 17 mounting the membrane switch 16 to the base plate 11 and is not fixed to the cover portion 31 of the cover body 21, at a time when the air bag 14 is expanded and deployed so as to form the projecting port of the air bag 14, the back plate 17 is developed in such a manner as to be independent from the cover body 21 while the switch holding portion 17a and the extending portion 17b are deformed, thereby not affecting the opening of the door piece portions 37a and 37b of the cover body 21. In addition, since the membrane switch 16 is fixed to the back plate 17 at only one point, the back plate 17 itself is freely deformable and deployable without being affected by the membrane switch 16, so that any forces such as tensional or compressional forces as would be in the case a plurality of adhering points will not be generated. Accordingly, the door piece portions 37a and 37b of the cover body 21 and the switch apparatus 18 can smoothly be deployed and the air bag 14 can be rapidly and smoothly expanded and inflated.

Moreover, since the membrane switch 16 can be fixed to the back plate 17 at a point (a portion), and can be easily fixed by a simple operation such as inserting the locking portion 41 into the lock receiving portion 46 so as to rotate, a manufacturing process can be simplified, assembly time and manufacturing cost can be reduced. Further, an engaging operation can be made easy by holding the shaft portion 42 of the locking portion 41 by the shaft receiving hole portion 49 of the lock receiving portion 46 in such a manner as to freely rotate, and the movement to the insertion hole portion 50 is prevented by holding the shaft portion 42 by means of the shaft receiving hole portion 49, so that the membrane switch 16 can be securely positioned and held.

Further, since the locking portion 41 is integrally formed in the back plate 17, a number of the parts is not increased, a structure can be made simple and a manufacturing cost can be reduced.

Still further, the membrane switch 16 can be stably held even at a point fixation since the center portion is fixed to the back plate 17.

Furthermore, since the locking piece portion 43 of the back plate 17 is projected along the both sides direction, that is, along a direction crossing the developing direction of the switch holding portion 17a of the back plate 17 (the direction of the arrow B), the influence given to the deformation of the back plate 17 can be reduced, and the switch apparatus can be smoothly deployed. Further, since the locking piece portion 43 is formed in a T like shape extending to both sides of the shaft portion 42, in comparison with the structure formed in a L like shape projecting only to one side, the stress can be uniformly dispersed even at a time of deployment of the back plate 17, and the shaft receiving hole portion 49 of the lock receiving portion 46 and the insertion hole portion 50 are deformed to a direction of compression, thereby securely holding the membrane switch 16.

Moreover, since the thin portion 38a is formed in the cover body 21 in such a manner as to oppose to the membrane switch 16 and the lower surface of the membrane switch 16 is supported by the back plate 17, at a time of pressing the horn operation portion in the cover portion 31, the switch body 16a can be efficiently deformed, an operation load can be reduced, a responsibility can be improved and an operation feeling can be improved. In this case, at this time, an operation feeling can be more easily improved by adjusting the hardness of the back plate 17 to be equal to or harder than that of the cover portion 31 of the cover body 21. Further, the cup portion 15b is disposed in the retainer 15 and the lower side of the back plate 17 is supported through a sheet of ground fabric, at a time of pressing the horn operation portion in the cover portion 31, a suitable response can be generated and an operation feeling can be improved.

Figure 6:
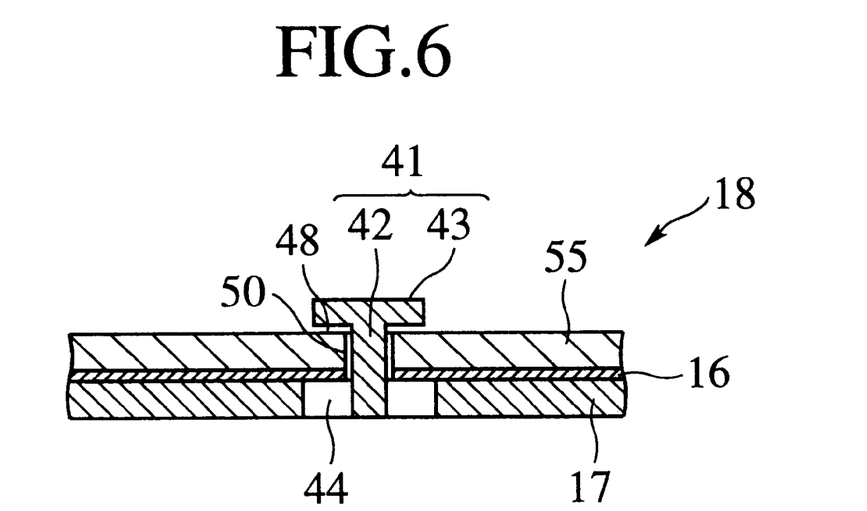
FIG. 6 is a partially cross sectional view which shows another embodiment of an air bag apparatus in accordance with the present invention.

In this case, in the embodiment mentioned above, the switch apparatus 18 is constituted by the membrane switch 16 and the back plate 17, however, as shown in FIG. 6, when three layers structure is constructed by layering a cushion member 55 elastically deforming on the members, the operational feeling can be easily improved. In addition, the cushion member 55 is arranged at the uppermost portion, that is, a side close to the cover body 21 of the membrane switch 16, it can be arranged between the membrane switch 16 and the back plate 17 or at the lowermost layer, that is, a side close to the air bag 14 of the back plate 17.

Figure 7A:
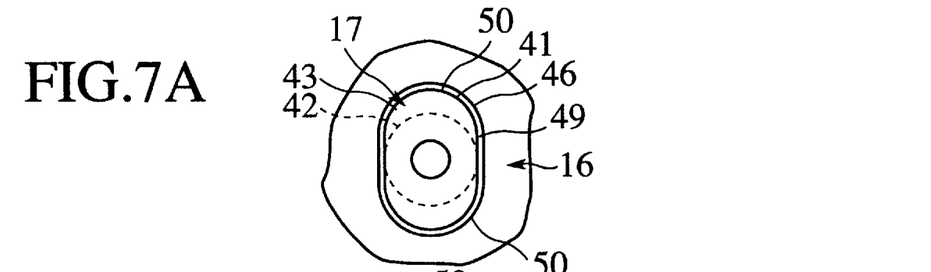
FIGS. 7A, 7B, 7C, 7D and 7E are schematic views which show the other embodiment in accordance with the present invention.
Figure 7B:
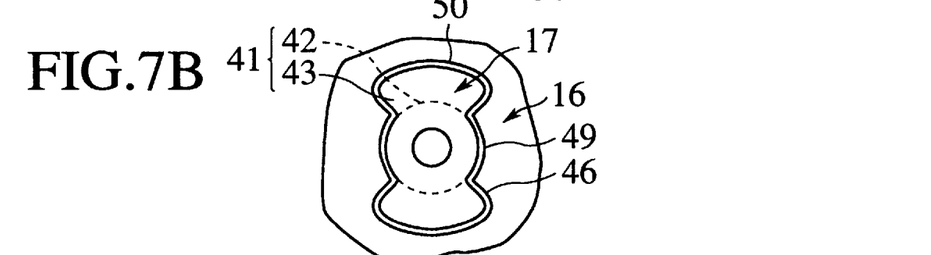
Figure 7C:
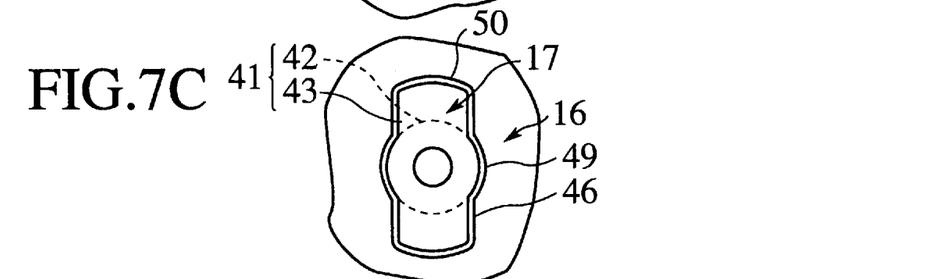
Figure 7D:
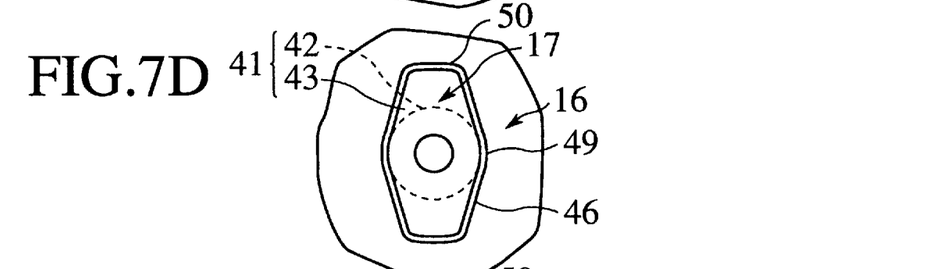
Figure 7E:
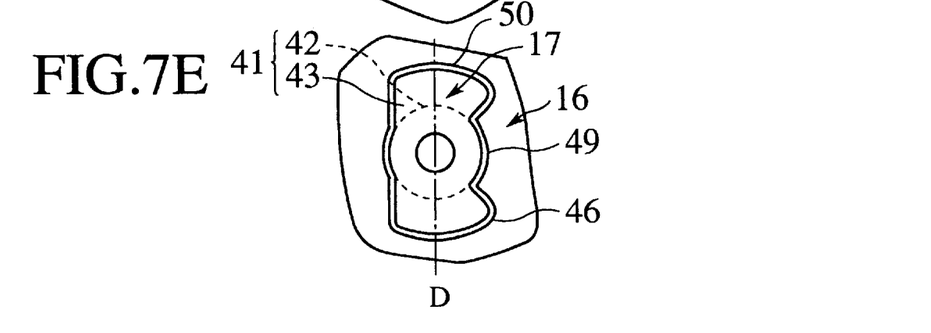

Further, in the embodiment mentioned above, the locking portion 41 is formed substantially in a T shape which projects the locking piece portion 43 to the both sides direction from the upper end portion of the shaft portion 42, and the lock receiving portion 46 is provided with the shaft receiving hole portion 49 rotatably holding the shaft portion 42 and the insertion hole portion 50 through which the locking piece portion 43 can pass, however, the locking portion 41 and the lock receiving portion 46 can be formed in various kinds of shapes which engages with each other. For example, as shown in FIG. 7A, the locking portion 41 and the lock receiving portion 46 can be formed in a long flat circular shape and the shaft receiving hole portion 49 and the insertion hole portion 50 can be formed in the same width. Further, as shown in FIGS. 7B and 7C, by forming the shaft receiving hole portion 49 in a circular hole shape so as to form various kinds of locking hole portion 50, or as shown in FIG. 7D, by making the insertion hole portion 50 narrower toward the terminal side, the shaft portion 42 can be rotatably supported by the shaft receiving hole portion 49, a free movement toward the insertion hole portion 50 can be prevented, and the membrane switch 16 can be easily and securely rotated. Further, the locking portion 41 and the lock receiving portion 46 are not always formed in a symmetrical shape such as a line symmetrical shape or a rotation symmetrical shape, and as shown in FIG. 7E, the locking portion 41 and the lock receiving portion 46 can be formed in an asymmetrical shape with respect to a center line D. Then, the front and back of the membrane switch 16 can easily be confirmed by forming it in an asymmetrical shape. Then, the asymmetrical structure shown in FIG. 7E is effective for the structure of making the thickness of the film in the front and back of the membrane switch 16 different, or the case that the planner shape of the membrane switch 16 is formed in an asymmetrical shape.

Figure 8A:
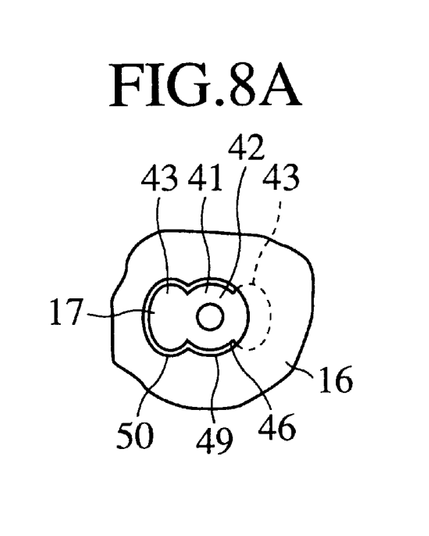
FIG. 8A is a plan view.
Figure 8B:
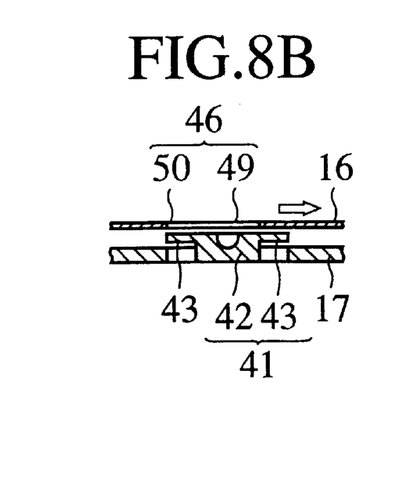
FIG. 8B is a cross sectional view of FIG. 8A.
Figure 8C:
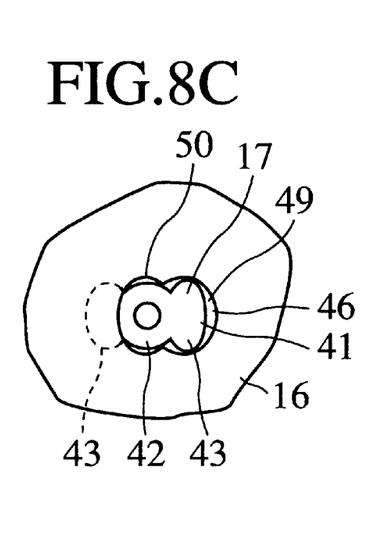
FIG. 8C is a plan view of a process following to FIG. 8A.
Figure 8D:
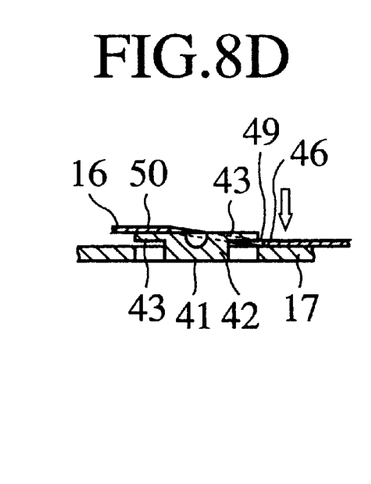
FIG. 8D is a cross sectional view of FIG. 8C.
Figure 8E:
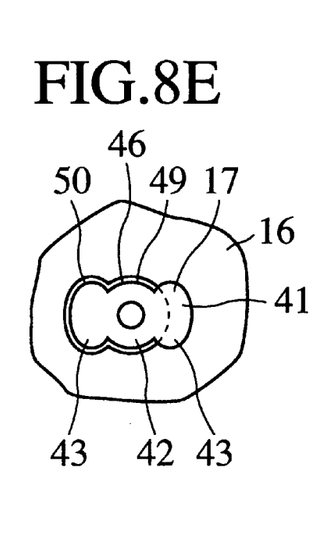
FIG. 8E is a plan view of a process following to FIG. 8C.
Figure 8F:
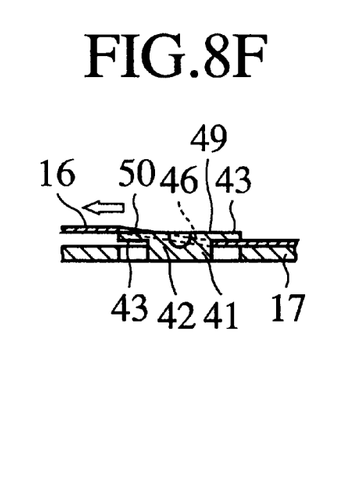
FIG. 8F is a cross sectional view of FIG. 8E.
Figure 8G:
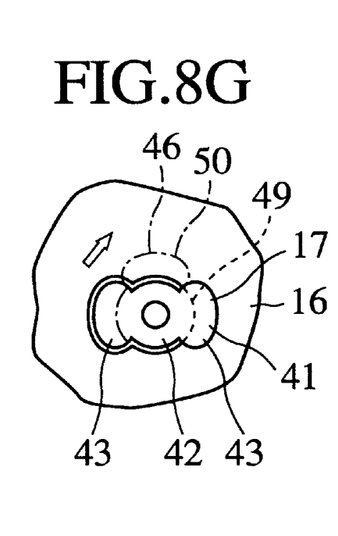
FIG. 8G is a plan view of a process following to FIG. 8E
Figure 8H:
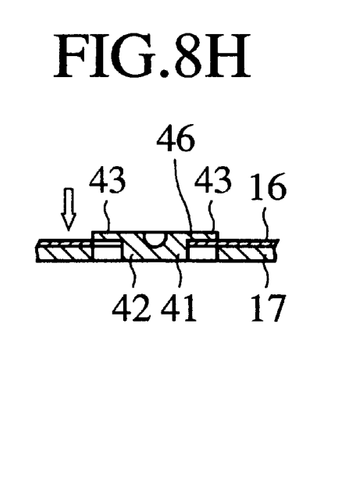
FIG. 8H is a cross sectional view of FIG. 8G.

Further, the locking portion 41 can be formed substantially in a T shape by projecting the locking piece portion 43 in both sides of the shaft portion 42, and can be formed substantially in an L shape by projecting the locking piece portion 43 in one side of the shaft portion 42, and further, with respect to the lock receiving portion 46, the insertion hole portion 50 can be formed in one side of the shaft receiving hole portion 49. For example, as shown in FIG. 8, the locking portion 41 having a substantially T shape and projecting the locking piece portion 43 in both sides of the shaft portion 42 can be combined with the lock receiving portion 46 forming the insertion hole portion 50 only in one side of the shaft receiving hole portion 49. In this case, as shown in FIGS. 8A and 8B, in a state of aligning the insertion hole portion 50 with one locking piece portion 43, as shown in FIGS. 8C and 8D, by drawing the membrane switch 16 by using a flexibility so as to deform, and at first inserting the opposite locking piece portion 43 in the shaft receiving hole portion 49, and as shown in FIGS. 8E and 8F, by inserting the locking piece portion 43 of one locking piece portion 43 in the insertion hole portion 50, and further as shown in FIGS. 8G and 8H, by rotating the membrane switch 16 to a predetermined position, the membrane switch 16 can be mounted to the back plate 17. Then, in this structure, the shaft receiving hole portion 49 can be easily deformed so as to be easily inserted in the locking piece portion 43, and can be easily locked, and the locking portion 41 can be made in such a manner as to be hard to be drawn out from the lock receiving portion 46.

Figure 9:
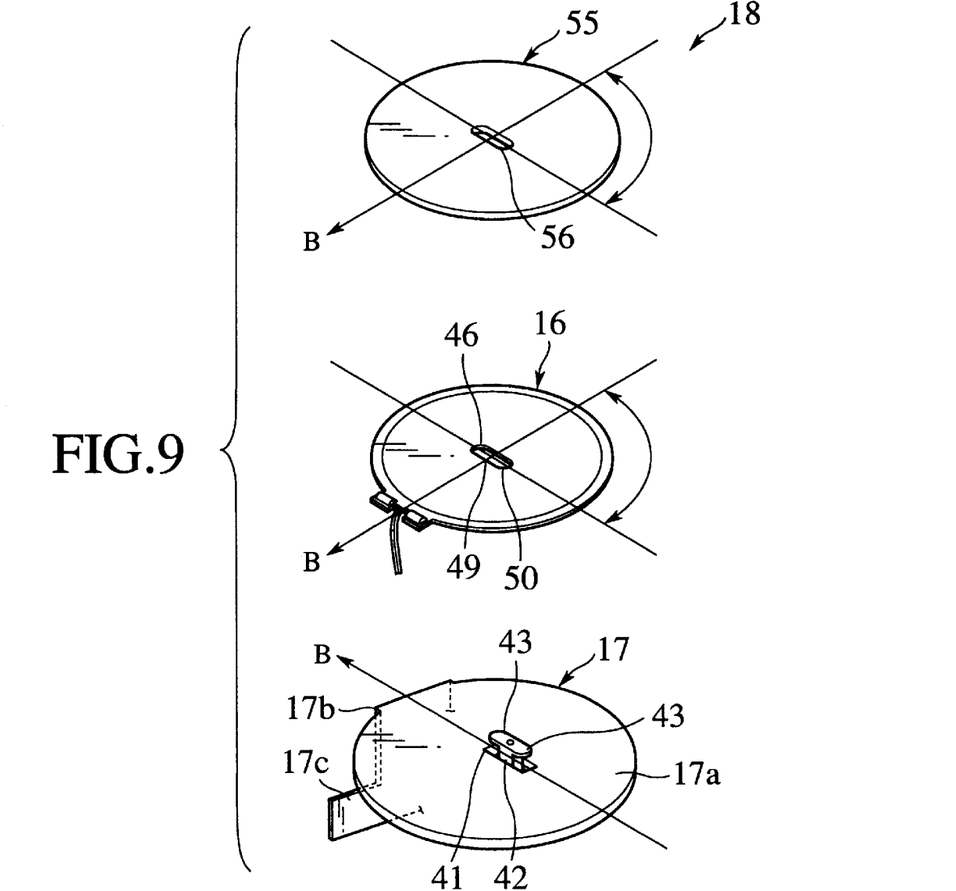
FIG. 9 is a partially exploded schematic view which shows the other embodiment in accordance with the present invention.

Further, in the embodiment mentioned above, in the locking piece portion 43 of the locking portion 41 in the back plate 17, the both sides direction, that is, the direction crossing to the developing direction is set to be a longitudinal direction, the locking piece portion 43 can, for example, as shown in FIG. 9, be projected along the longitudinal direction, that is, the developing direction (the direction of the arrow B) of the switch holding portion 17a in the back plate 17. Then, the membrane switch 16 can be easily and securely held by projecting the locking piece portion 43 along the deploying direction even when the back plate 17 is deployed. In the embodiment shown in FIG. 9, as in the same manner as that shown in FIG. 7A, the locking piece portion 43 and the like are formed in a long circular shape. Further, as well as the cushion member 55 is disposed above the membrane switch 16, the long circular through hole 56 is formed as in the same manner as the case of the membrane switch 16. Then, the membrane switch 16 and the cushion member 55 is locked with the back plate 17 by inserting the locking portion 41 into each of the hole portions 49 and 50 and the through hole 56 at a position rotating at about 90 degrees from a predetermined direction, rotating at about 90 degrees in this state, and aligning the lead line 16d with the extending portion 17b, so that it can be easily fixed without using the other member.

Figure 10:
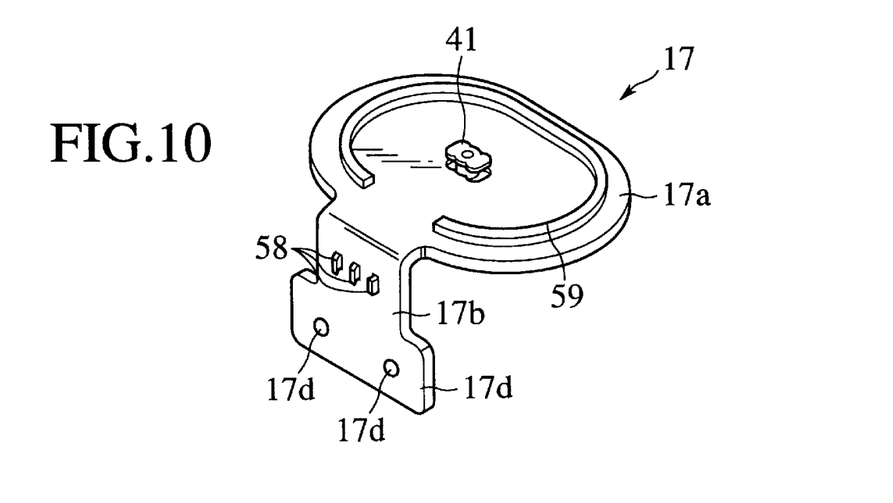
FIG. 10 is a partially schematic view which shows the other embodiment in accordance with the present invention.

Further, in each of the embodiments mentioned above, as shown in FIG. 10, a holding portion 58 holding the lead line 16d of the membrane switch 16 by an engagement (a clip-on) can be independently provided in the extending portion 17b of the back plate 17. Then, the lead wire 16d can be held at a predetermined position and a positional shift such as a relative rotation of the membrane switch 16 with respect to the back plate 17 can be prevented by providing the holding portion 58 and holding the lead wire 16d. Still further, in the structure shown in FIG. 10, the rib portion 59 having a substantially planner C shape is formed in the switch holding portion of the back plate 17 so as to be brought into contact with the peripheral edge portion of the membrane switch 16, thereby restricting the position.

Figure 11:
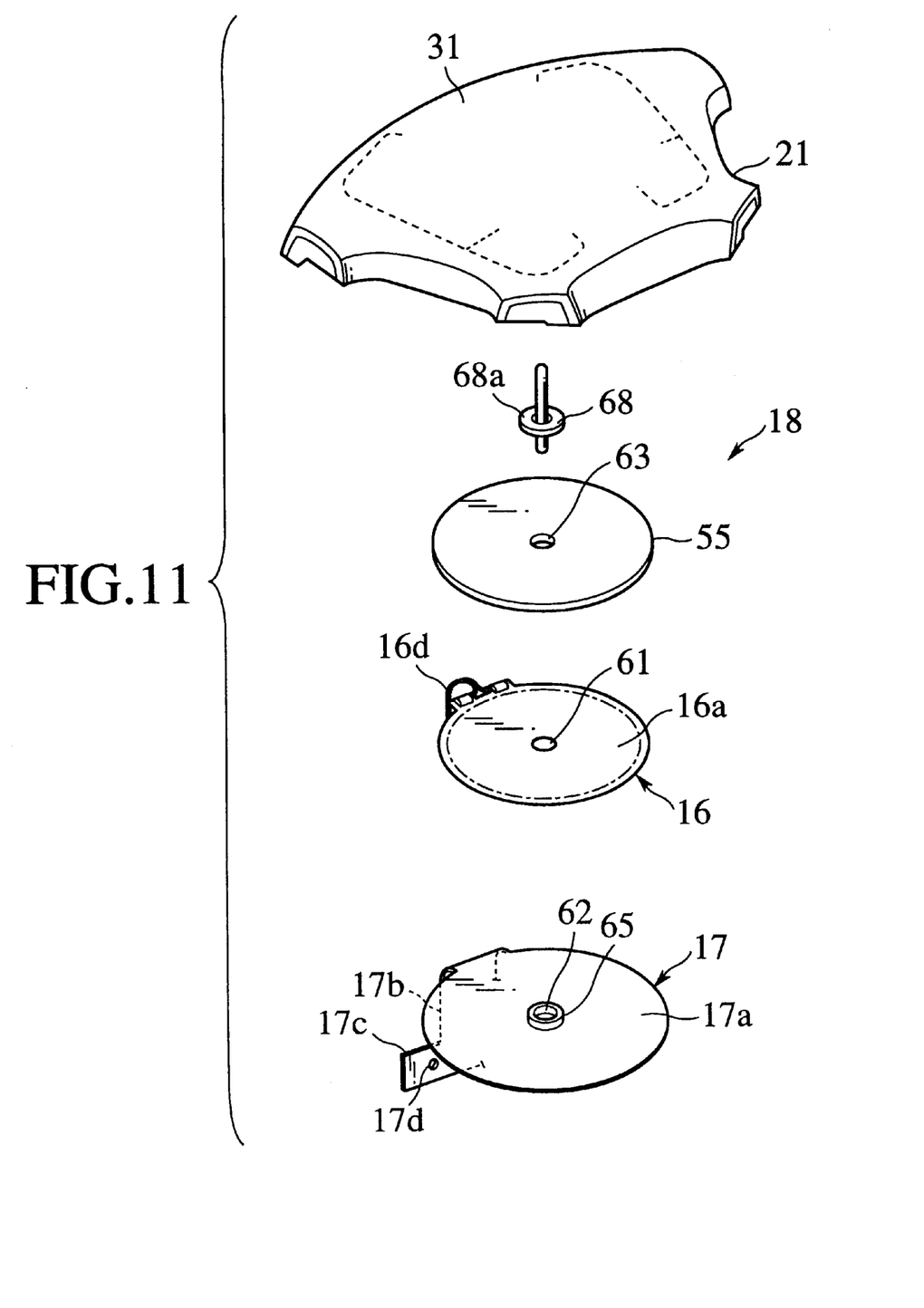
FIG. 11 is a partially exploded schematic view which shows the other embodiment of an air bag apparatus in accordance with the present invention.
Figure 12:
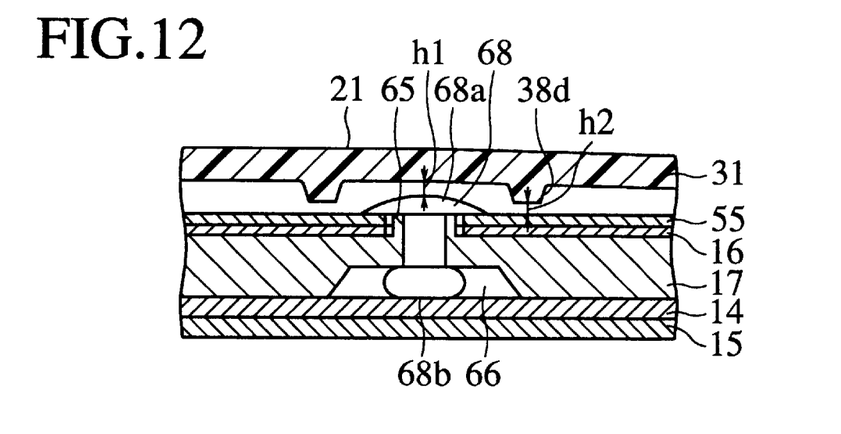
FIG. 12 is a partially cross sectional view of the air bag apparatus.

Still further, in each of the embodiments mentioned above, the membrane switch 16 is mounted to the back plate 17 by a locking, however, the membrane switch 16 can be mounted to the back plate 17 by the other methods such as a caulking by using rivets, a thermal deposition, a bonding and the like. For example, as shown in FIGS. 11 and 12, the locking portion and the lock receiving portion are not formed in the membrane switch 16, the back plate 17 and the cushion member 55, but circular holes 61, 62 and 63 are respectively formed therein. Further, a cylindrical boss 65 is formed on the top surface of the back plate 17 in such a manner as to surround the circular hole 62. Then, the boss 65 is formed in such a manner as to have a diameter insertable into the circular hole 62 of the membrane switch 16, and is also formed in such a manner as to have a height (about 0.5 mm) corresponding to the thickness of the membrane switch 16, that is, a height equal to or slightly higher than the thickness of the membrane switch 16. Still further, a recess portion 66 is formed on the lower surface of the back plate 17 in such a manner as to surround the circular hole 62. Then, the membrane switch 16, the back plate 17 and the cushion member 55 are integrally adhered by caulking the rivet 68 inserted into the circular holes 61, 62 and 63 from the above. Accordingly, a diameter of a head portion 68a above the rivet 68 is greater than a diameter of the circular holes 61 and 63 of the membrane switch 16 and the cushion member 55, and a caulked leg portion 68b in the lower side is greater than a diameter of the circular hole 62 of the back plate 17 and is housed within the recess portion 66. Then, in this state, it is structured such that the membrane switch 16, the back plate 17 and the cushion member 55 are held and fixed between the head portion 68a of the rivet 68 and the leg portion 68b. Furthermore, a separating size h1 between the head portion 68a of the rivet 68 and the cover portion 31 of the cover body 21 is greater than a separating size h2 between the top surface of the membrane switch 16 and the projection 38d of the cover portion 31, that is, a relation of h1>h2 is satisfied, so that it is structured such that the membrane switch 16 is smoothly closed by pressing the cover portion 31.

Figure 13:
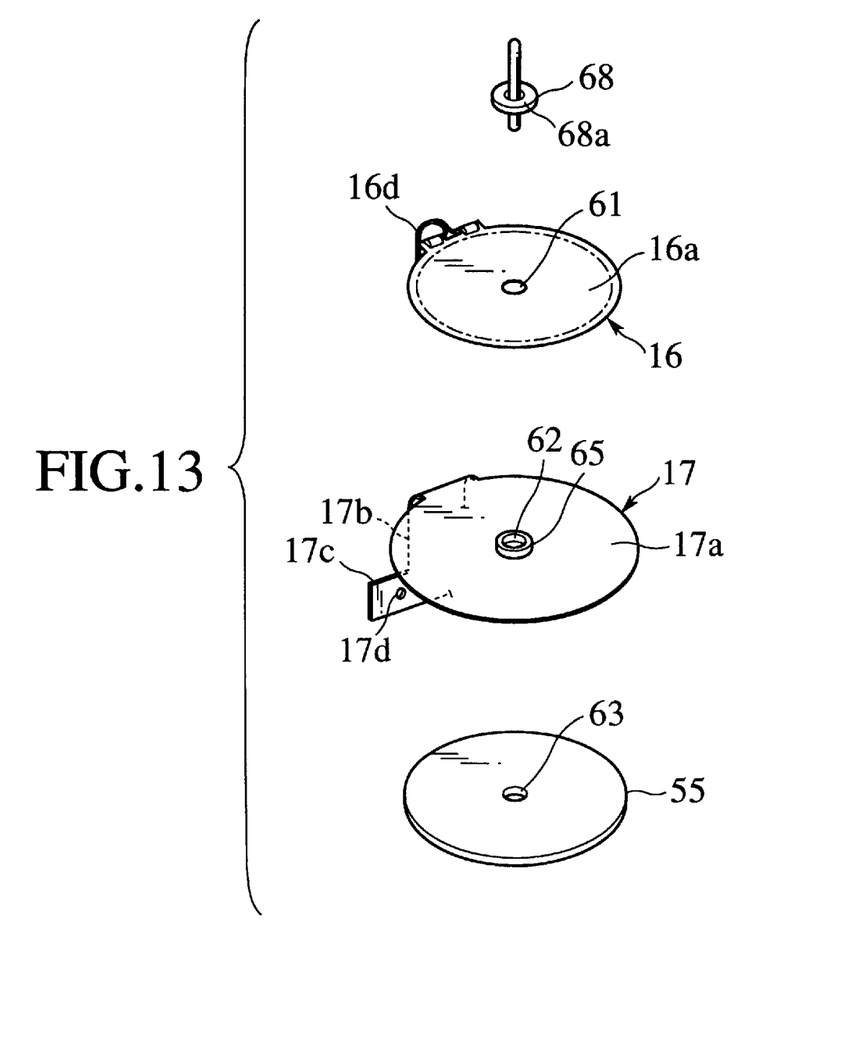
FIG. 13 is a partially exploded schematic view which shows the other embodiment of an air bag apparatus in accordance with the present invention.

Here, in the embodiment shown in FIGS. 11 and 12, the cushion member 55 is provided above the membrane switch 16, however, as shown in FIG. 13, the cushion member 55 may be provided below the back plate 17. Further, although illustration is omitted, the cushion member 55 can be provided between the membrane switch 16 and the back plate 17, and further the cushion member 55 can be omitted.

Further, in each of the embodiments mentioned above, the membrane switch 16 in the switch apparatus 18 is formed in a flat oval shape, however, various kinds of shapes such as a circular shape, a rectangular shape and the like can be employed. Still further, the switch apparatus 18 can be structured such that a plurality of membrane switches 16 are disposed on the top surface of the switch holding portion 17a in the back plate 17 in parallel and the center portion of each of the membrane switch 16 is adhered to the back plate 17 at one point.

Still further, in each of the embodiments mentioned above, the air bag apparatus 4 disposed in the steering wheel 1 has been described, however, the present invention can be applied to an air bag apparatus disposed in an instrument panel, a seat or the like, as far as the switch is provided.

While preferred embodiments of the present invention have been described using specific terms, such description is for illustrative purposes, and it is to be understood that changes and variations may be made without departing from the spirit or scope of the following claims.

What is claimed is:

1. An air bag apparatus comprising:

an air bag expanding and inflating by a generating gas;

a cover body having a deformable and tearable cover portion for covering the air bag; and a switch apparatus disposed between the air bag and the cover portion, wherein the switch comprises:

a contact point body substantially formed in a plate shape;

a support body having a support portion for supporting a side of the contact point body close to the air bag and a deformable extending portion extended from the support portion; and an adhering member adhering the contact point body to the support body at a point.

2. The air bag apparatus according to claim 1, wherein the adhering member is integrally formed in at least one of the contact point body and the support body.

3. The air bag apparatus according to claim 1, wherein the adhering member is provided with a locking portion disposed in the support body; and a lock receiving portion locked by an insertion of the locking portion is provided in the contact point body.

4. The air bag apparatus according to claim 3, wherein the locking portion is provided with a shaft portion and a locking piece portion projecting from the shaft portion; and the lock receiving portion is provided with a shaft receiving hole portion into which the shaft portion is rotatably inserted, an insertion hole portion continuously disposed in the shaft receiving hole portion and to which the locking piece portion can be inserted, and with a locking surface portion supporting the locking piece portion.

5. The air bag apparatus according to claim 3, wherein the locking portion is provided with a locking piece portion projecting to a direction substantially along the deploying direction of the switch body.

6. The air bag apparatus according to claim 3, wherein the locking portion is provided with a locking piece portion projecting to a direction crossing to the deploying direction of the switch body.

7. The air bag apparatus according to claim 1, wherein the switch apparatus is provided with an elastically deformable cushion member.

8. An air bag apparatus comprising:

an air bag expanding and inflating by a generating gas;

a cover body having a deformable and tearable cover portion for covering the air bag; and a switch apparatus disposed between the air bag and the cover portion, wherein the switch comprises:

- a contact point body substantially formed in a plate shape;
- a support body having a support portion for supporting a side of the contact point body close to the air bag and a deformable extending portion extended from the support portion; and
- an adhering member adhering the contact point body to the support body at a centrally located portion of the contact point body.

9. The air bag apparatus according to claim 8, wherein the adhering member is integrally formed in at least one of the contact point body and the support body.

10. The air bag apparatus according to claim 8, wherein the adhering member is provided with a locking portion disposed in the support body; and a lock receiving portion locked by an insertion of the locking portion is provided in the contact point body.

11. The air bag apparatus according to claim 10, wherein the locking portion is provided with a shaft portion and a locking piece portion projecting from the shaft portion; and the lock receiving portion is provided with a shaft receiving hole portion into which the shaft portion is rotatably inserted, an insertion hole portion continuously disposed in the shaft receiving hole portion and to which the locking piece portion can be inserted, and with a locking surface portion supporting the locking piece portion.

12. The air bag apparatus according to claim 10, wherein the locking portion is provided with a locking piece portion projecting to a direction substantially along the deploying direction of the switch body.

13. The air bag apparatus according to claim 10, wherein the locking portion is provided with a locking piece portion projecting to a direction crossing to the deploying direction of the switch body.

14. The air bag apparatus according to claim 8, wherein the switch apparatus is provided with an elastically deformable cushion member.

* * * * *